(12) United States Patent
Shinoda

(10) Patent No.: US 8,988,544 B2
(45) Date of Patent: Mar. 24, 2015

(54) HIGH DYNAMIC RANGE IMAGING DEVICE AND IMAGE SYNTHESIS PROGRAM

(75) Inventor: Tomotaka Shinoda, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/190,062

(22) Filed: Jul. 25, 2011

(65) Prior Publication Data

US 2012/0026365 A1   Feb. 2, 2012

(30) Foreign Application Priority Data

Jul. 30, 2010  (JP) .................................. 2010-173029
Jul. 22, 2011  (JP) .................................. 2011-161133

(51) Int. Cl.
*H04N 5/228* (2006.01)
*H04N 5/235* (2006.01)
*H04N 5/225* (2006.01)

(52) U.S. Cl.
CPC .................................. *H04N 5/2355* (2013.01)
USPC ..................................... 348/222.1; 348/220.1

(58) Field of Classification Search
USPC ....................................... 348/220.1, 2, 222.1
See application file for complete search history.

(56) References Cited

U.S. PATENT DOCUMENTS

| | | | | |
|---|---|---|---|---|
| 5,309,243 A | * | 5/1994 | Tsai ............................ | 348/221.1 |
| 5,828,793 A | * | 10/1998 | Mann ............................ | 382/284 |
| 6,204,881 B1 | * | 3/2001 | Ikeda et al. .................... | 348/362 |
| 7,570,809 B1 | * | 8/2009 | Srinivasa ....................... | 382/167 |
| 7,884,856 B2 | * | 2/2011 | Niikura ....................... | 348/221.1 |
| 8,144,214 B2 | * | 3/2012 | Yamashita et al. ......... | 348/229.1 |
| 8,264,594 B2 | * | 9/2012 | Yeo et al. ....................... | 348/362 |
| 2003/0128893 A1 | * | 7/2003 | Castorina et al. ............. | 382/284 |
| 2006/0177150 A1 | * | 8/2006 | Uyttendaele et al. ......... | 382/284 |
| 2007/0024742 A1 | * | 2/2007 | Raskar et al. ................. | 348/370 |
| 2008/0316354 A1 | * | 12/2008 | Nilehn et al. ................. | 348/362 |
| 2009/0174792 A1 | * | 7/2009 | Kusaka et al. ............. | 348/230.1 |

FOREIGN PATENT DOCUMENTS

JP    A-2003-319240    11/2003
JP    A-2008-160881    7/2008

OTHER PUBLICATIONS

Jan. 21, 2014 Office Action issued in Japanese Patent Application No. 2011-161133 (with translation).
Nov. 4, 2014 Office Action issued in Japanese Application No. 2011-161133.

* cited by examiner

*Primary Examiner* — Ngoc-Yen Vu
(74) *Attorney, Agent, or Firm* — Oliff PLC

(57) ABSTRACT

An imaging device includes an imaging element, a RAM, an adding synthesizing unit, and a high dynamic range synthesizing means. The imaging element captures an image of a subject and generates image data. The RAM temporarily stores plural pieces of image data that have been consecutively captured by the imaging element. The adding synthesizing means adds and synthesizes the plural pieces of image data stored in the RAM to generate synthesized image data. The high dynamic range synthesizing means synthesizes one of the plural pieces of image data with the synthesized image data to generate high dynamic range image data and outputs the generated high dynamic range image data.

11 Claims, 4 Drawing Sheets

HIGH DYNAMIC RANGE IMAGING DEVICE AND IMAGE SYNTHESIS PROGRAM

CROSS-REFERENCE TO RELATED APPLICATIONS

This application is based upon and claims the benefit of priority from prior Japanese Patent Application No. 2010-173029, filed on Jul. 30, 2010, and Japanese Patent Application No. 2011-161133, filed on Jul. 22, 2011, the entire contents of which are incorporated herein by reference.

BACKGROUND ART

The present invention relates to an imaging device and an image synthesis program.

High dynamic range (HDR) imaging techniques known in the art use a plurality of images of the same subject having both a dark area and a bright area captured under different exposures so that such images can be synthesized into a single composite image without the dark area being crushed black and the bright area including blown-out highlights (refer to, for example, Japanese Laid-Open Patent Publication No. 2003-319240).

Such HDR imaging techniques conventionally require a plurality of images captured under different exposures to undergo position corrections before the images are synthesized into a single composite HDR image.

The position corrections of the captured images are typically performed by extracting the contour of the subject in each image and comparing the contours extracted from the different images. However, the images captured under different exposures often fail to have the same contours that can be extracted easily. This requires processing for predicting positional differences between the images. Such processing requires additional time.

SUMMARY OF THE INVENTION

Accordingly, it is an object of the present invention to provide an imaging device and an image synthesis program that enable high dynamic range imaging to be performed using images with less positional differences.

To achieve the above object, one aspect of the present invention is an imaging device including an imaging means for capturing an image of a subject and generating image data, a storing means for temporarily storing plural pieces of image data consecutively captured by the imaging means, a first synthesizing means for adding and synthesizing the plural pieces of image data stored in the storing unit to generate first image data, a second synthesizing means for synthesizing one of the plural pieces of image data with the first image data to generate second image data, and an outputting means for outputting the second image data generated by the second synthesizing means.

In one example, the outputting means sequentially outputs the second image data generated by the second synthesizing means.

In one example, the second synthesizing means synthesizes with the first image data at least one piece of image data including the image data having the lowest brightness level among the plural pieces of image data.

In one example, the second synthesizing means synthesizes with the first image data at least one piece of image data including the image data having the lowest brightness level among the plural pieces of image data.

In one example, the second synthesizing means reduces the number of pieces of image data used as the at least one of the plural pieces of image data that is synthesized with the first image data when the brightness of the image data is relatively high as compared with when the brightness of the image data is relatively low.

In one example, the first synthesizing means adds and synthesizes the plural pieces of image data captured per predetermined time by the imaging means and generates the first image data, and the outputting means sequentially outputs the second image data generated by the second synthesizing means in predetermined time intervals.

In one example, the plural pieces of image data are a predetermined number of pieces of image data, each captured at a first shutter speed. Further, the first image data is low-brightness side image data corresponding to a virtual shutter speed that is lower than the first shutter speed, and the low-brightness side image data is generated by adding the predetermined number of pieces of image data. Before generating the second image data, the second synthesizing means generates high-brightness side image data by adding a smaller number of pieces of image data than the predetermined number that include the oldest piece of image data captured at the first speed at the oldest timing among the predetermined number of pieces of image data or uses the oldest piece of image data among the predetermined number of pieces of image data as the high-brightness side image data. The second synthesizing means synthesizes the low-brightness side image data and the high-brightness side image data to generate the second image data.

In one example, the plural pieces of image data are a predetermined number of pieces of image data that are captured at a plurality of shutter speeds. Further, the first image data is low-brightness side image data corresponding to a virtual shutter speed that is lower than the plurality of shutter speeds, and the low-brightness side image data is generated by adding the predetermined number of pieces of image data. Before generating the second image data, the second synthesizing means generates high-brightness side image data by adding a smaller number of pieces of image data than the predetermined number that include the piece of image data captured at the highest shutter speed among the predetermined number of pieces of image data or uses the piece of image data captured at the highest shutter speed among the predetermined number of pieces of image data as the high-brightness side image data. The second synthesizing means synthesizes the low-brightness side image data and the high-brightness side image data to generate the second image data.

In one example, the plural pieces of image data are a predetermined number of pieces of image data, each of which is captured under a first exposure condition. Further, the first image data is low-brightness side image data corresponding to a virtual exposure condition more suitable for capturing a low brightness level subject than the first exposure condition, and the low-brightness side image data is generated by adding the predetermined number of pieces of image data. Before generating the second image data, the second synthesizing means generates high-brightness side image data by adding a smaller number of pieces of image data than the predetermined number that include the oldest piece of image data captured under the first exposure condition at the oldest timing among the predetermined number of pieces of image data or uses the oldest piece of image data among the predetermined number of pieces of image data as the high-brightness side image data. The second synthesizing means synthesizes the low-brightness side image data and the high-brightness side image data to generate the second image data.

In one example, the plural pieces of image data are a predetermined number of pieces of image data that are captured under a plurality of exposure conditions. Further, the first image data is low-brightness side image data corresponding to a virtual exposure condition more suitable for a low brightness level subject than any of the plurality of exposure conditions, and the low-brightness side image data is generated by adding the predetermined number of pieces of image data. Before generating the second image data, the second synthesizing means generates high-brightness side image data by adding a smaller number of pieces of image data than the predetermined number that include the piece of image data captured under the exposure condition most suitable for a high brightness level subject among the predetermined number of pieces of image data or uses the image data most suitable for a high brightness level subject as the high-brightness side image data. The second synthesizing means synthesizes the low-brightness side image data and the high-brightness side image data to generate the second image data.

In a further aspect of the present invention, an image synthesis program has a computer perform temporarily storing plural pieces of image data consecutively captured by an imaging means that captures an image of a subject and generates image data, adding and synthesizing the stored plural pieces of image data to generate first image data, synthesizing one of the plural pieces of image data with the first image data to generate second image data, and outputting the generated second image data.

In another aspect of the present invention, an imaging device includes an imaging means for capturing an image of a subject and generating image data, a first synthesizing means for aligning a piece of image data with reference image data and adding and synthesizing the piece of image data and the reference image data to generate first image data, and a second synthesizing means for synthesizing the reference image data and the first image data to generate second image data.

In still a further aspect of the present invention, an image synthesis program has a computer perform capturing an image of a subject and generating image data, aligning a piece of image data with reference image data and adding and synthesizing the piece of image data and the reference image data to generate first image data, and synthesizing the reference image data and the first image data to generate second image data.

The present invention decreases positional differences of images and allows for high dynamic range imaging to be performed.

DESCRIPTION OF EMBODIMENTS OF THE INVENTION

First Embodiment

A digital camera (hereafter simply a "camera") according to a first embodiment of the present invention, which functions as an imaging device that can form both a still image and a moving image, and an imaging method for forming a high dynamic range (HDR) image of a subject with this camera will now be described with reference to FIGS. 1 to 7.

Figure 1:
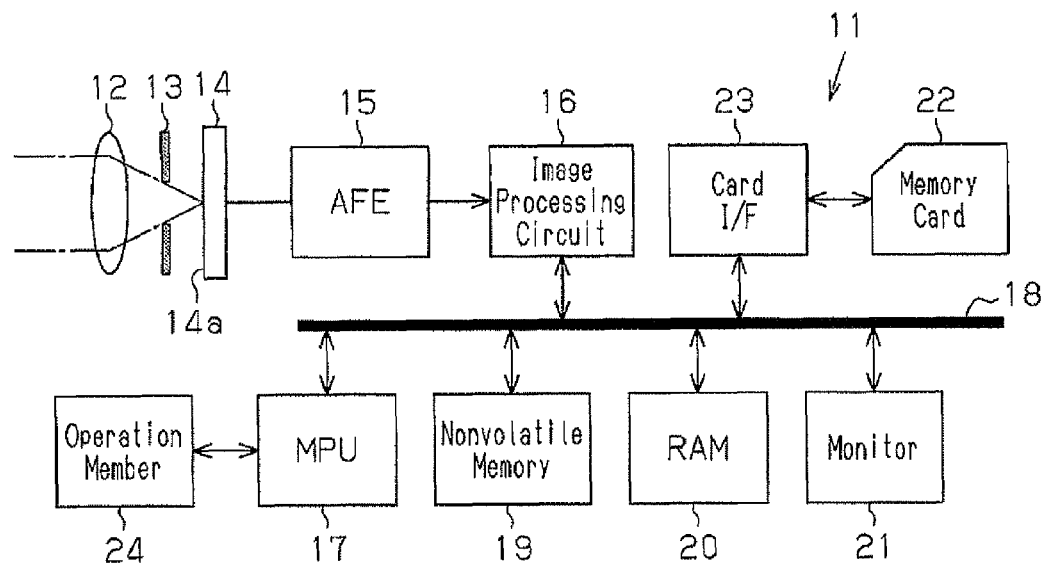
FIG. 1 is a block diagram of a digital camera according to a first embodiment of the present invention.

As shown in FIG. 1, the camera 11 includes a lens unit 12 and a diaphragm 13. The lens unit 12 is formed by a plurality of lenses, such as zoom lenses (only one lens is shown in FIG. 1 to simplify the drawing). The diaphragm 13 adjusts the amount of captured subject light that has passed through the lens unit 12. The camera 11 further includes an imaging element 14 that focuses the captured subject light onto its light receiving surface 14a, which functions as an imaging surface positioned at the incident side of the imaging element 14. The imaging element 14 functions as an imaging means. An analog front end (AFE) 15 and an image processing circuit 16 are connected to the output side of the imaging element 14. A micro processing unit (MPU) 17 is connected to the image processing circuit 16 with a data bus 18.

A nonvolatile memory 19, a RAM 20, a monitor 21, and a card interface (I/F) 23 are connected to the MPU 17 with the data bus 18. The nonvolatile memory 19 stores control programs for controlling the camera 11. The RAM 20 functions as a storing unit. The monitor 21 uses a liquid crystal display. The monitor 21 functions as a display unit. The camera body (not shown) includes an operation member 24, with which data or operation signals (including a mode switching signal and a signal indicating a halfway pressing operation) can be transmitted to the MPU 17. The operation member 24 includes a mode switching button and a shutter button that are operated by a user of the camera 11. The MPU 17 functions as a computer.

The imaging element 14 is formed by a complementary metal oxide semiconductor (CMOS) imaging element or a charge coupled device (CCD) imaging element. On its light receiving surface 14a, the imaging element 14 has a large number of light-receiving elements (not shown) arranged in a two-dimensional manner. The imaging element 14 accumulates signal charge corresponding to a subject image formed on the light receiving surface 14a. The imaging element 14 then provides, to the AFE 15, the accumulated signal charge as an analog signal called a pixel signal, which forms image data.

The AFE 15 includes a signal processing unit and an A/D conversion unit (both not shown). The signal processing unit samples, at a predetermined timing, a pixel signal or an analog signal provided from the imaging element 14 (through correlated double sampling), and amplifies the sampled signal to have a predetermined signal level that is determined based on the ISO speed. The A/D conversion unit converts the amplified pixel signal to a digital signal. The AFE 15 provides, to the image processing circuit 16, image data generated by the A/D conversion unit converting the analog pixel signal to a digital signal.

The image processing circuit 16 performs various image processes on the image data provided from the AFE 15 in accordance with a control signal provided from the MPU 17.

The image processing circuit 16 stores the processed image data temporarily into the RAM 20 and also displays the processed image data as an image through the lens (a through-lens image) on the monitor 21. When the shutter button is fully pressed, the image processing circuit 16 displays an image that is formed by the currently captured image data on the monitor 21 for the user to view, and also stores the image data into the memory card 22 as an image file after performing predetermined image processes including formatting for JPEG compression on the image data.

The MPU 17 centrally controls the various processes performed in the camera 11 (including high dynamic range (HDR) imaging and the like) based on control programs such as an image synthesis program stored in the nonvolatile memory 19. The data bus 18 functions as a transmission path of various data used in the control executed by the MPU 17.

The mode switching button included in the operation member 24 is operated to switch the operating mode of the camera 11. The camera 11 has, as its operating modes, a plurality of imaging modes and a playback mode. The imaging modes include a normal imaging mode, an HDR still image mode, and an HDR moving image mode.

The shutter button is pressed by the user to capture an image of a subject in one of the imaging modes of the camera 11. More specifically, the camera 11 performs auto focus for bringing the subject into focus and auto exposure for adjusting the exposure when the shutter button included in the operation member 24 is pressed halfway. The camera 11 subsequently performs image generation when the shutter button is fully pressed.

Further, the camera 11 has its imaging mode switchable to the HDR imaging modes. When the imaging mode is switched to the HDR still image mode or to the HDR moving image mode, the camera 11 obtains plural pieces of image data by capturing consecutive images of the same subject, and synthesizes the plural pieces of image data into HDR image data. The subject can have both a dark area and a bright area (refer to an image 25 shown in FIG. 2). The image 25 shown in FIG. 2 includes a landscape in which a sun 26 is on the upper left of a mountain 27 and the surface of a lake 28 at the foot of the mountain is darkened as it is shadowed by trees 29 standing on the lake side. The image 25 also includes moving horses 30 as a subject.

In the HDR still image mode and the HDR moving image mode, high dynamic range image data (hereafter, "HDR image data") is generated through high dynamic range synthesizing (hereafter, "HDR synthesizing"). The HDR image data, which functions as second image data, is sequentially output onto the monitor 21. As a result, the HDR image data is displayed on the monitor 21 as a through-lens image. When the shutter button included in the operation member 24 is pressed fully, the HDR image data is recorded onto the memory card 22.

Figure 3:
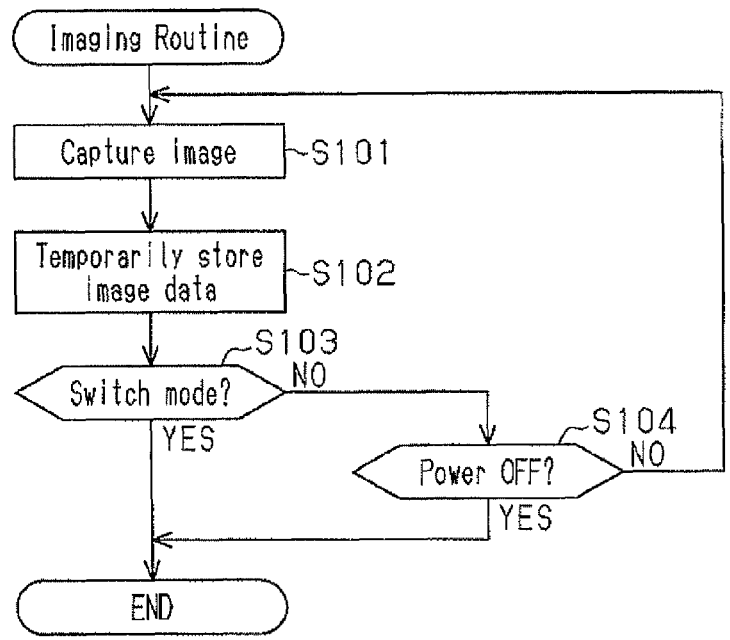
FIG. 3 is a flowchart illustrating an imaging routine.

A procedure for capturing an image of a subject using the camera 11 will now be described with reference to FIGS. 3 to 7. FIG. 3 shows an imaging routine performed when the camera 11 is powered on and the operating mode of the camera 11 is switched to one of the imaging modes (the normal imaging mode, the HDR still image mode, and the HDR moving image mode).

As shown in FIG. 3, the MPU 17 first captures an image of a subject under an initial exposure condition stored in the nonvolatile memory 19 in step S101. A different initial exposure condition is set for each different imaging mode. In the illustrated example, the shutter speed included in the initial exposure condition of the camera 11 is 1/30 seconds for the normal imaging mode. For the HDR still image mode and the HDR moving image mode, the shutter speed in the initial exposure condition is set to 1/120 seconds, which is higher than the shutter speed set for the normal imaging mode.

In step S102, the MPU 17 temporarily stores the captured image data obtained in step S101 into the RAM 20.

In step S103, the MPU 17 determines whether the operating mode has been switched to the playback mode. When determining that the mode switching button has been operated by the user to switch the operating mode from the imaging mode to the playback mode (YES in step S103), the MPU 17 ends the imaging routine.

When determining that the operating mode remains to be the imaging mode in step S103 (NO in step S103), the MPU 17 proceeds to step S104.

When determining that the camera 11 has been powered off in step S104 (YES in step S104), the MPU 17 ends the imaging routine. When determining that the camera 11 is on in step S104 (NO in step S104), the MPU 17 returns the processing to step S101.

In this manner, the camera 11 repeats the imaging routine described above while the camera is on and the operating mode remains to be the imaging mode. Through this routine, the camera 11 captures consecutive images of the subject, and sequentially stores the captured pieces of image data temporarily into the RAM 20.

When, for example, the operating mode of the camera is the normal imaging mode, plural pieces of image data captured consecutively at the shutter speed of 1/30 seconds are sequentially stored temporarily into the RAM 20. Each piece of image data is displayed on the monitor 21 as a through-lens image having 30 fps (frames per second), which corresponds to the shutter speed of 1/30 seconds.

Figure 4:
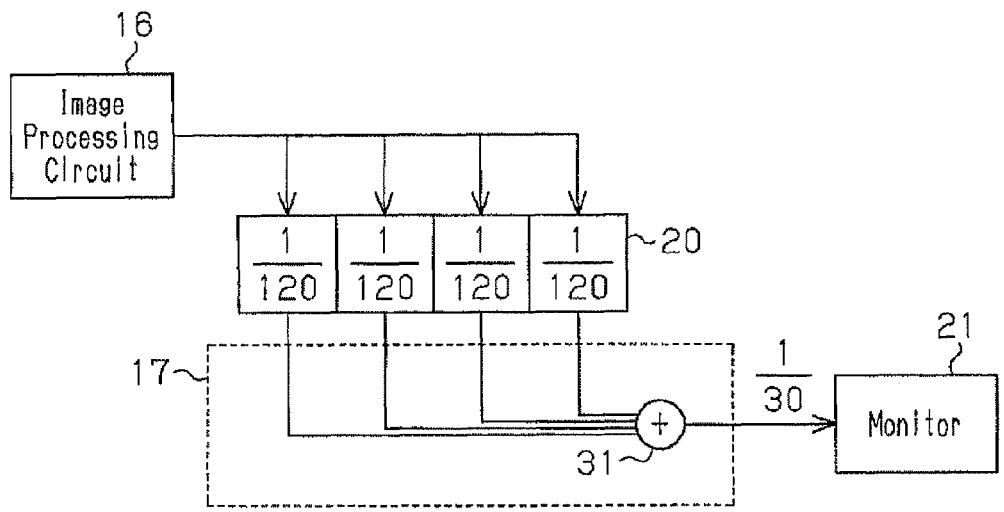
FIG. 4 is a diagram illustrating the procedures for generating a through-lens image.

When the operating mode of the camera is either the HDR still image mode or the HDR moving image mode as shown in FIG. 4, the MPU 17 sequentially stores plural pieces of image data captured consecutively at the shutter speed of 1/120 seconds temporarily into the RAM 20 (a storage procedure). The MPU 17 then synthesizes pieces of image data stored temporarily in the RAM 20 by adding these image data pieces to generate synthesized image data. The MPU 17 then outputs the synthesized image data onto the monitor 21 in predetermined time intervals (at, for example, every 1/30 seconds as in the normal imaging mode). As a result, the image data is displayed on the monitor as a through-lens image having 30 fps.

The synthesized image data functions as first image data. The synthesized image data, which is generated by adding and synthesizing four pieces of image data captured at every predetermined time (1/30 seconds), is about four times as bright as image data captured at the shutter speed of 1/120 seconds. Thus, the brightness of the synthesized image data is equivalent to the brightness of the image data obtained at the shutter speed of 1/30 seconds. When the subject has a small difference in brightness level between its bright area and its dark area, the brightness of the resulting through-lens image displayed on the monitor 21 will be equivalent to the brightness of the through-lens image displayed based on the image data obtained at the shutter speed of 1/30 seconds, although the shutter speed for the normal imaging mode and that for the HDR imaging mode are different.

Figure 5:
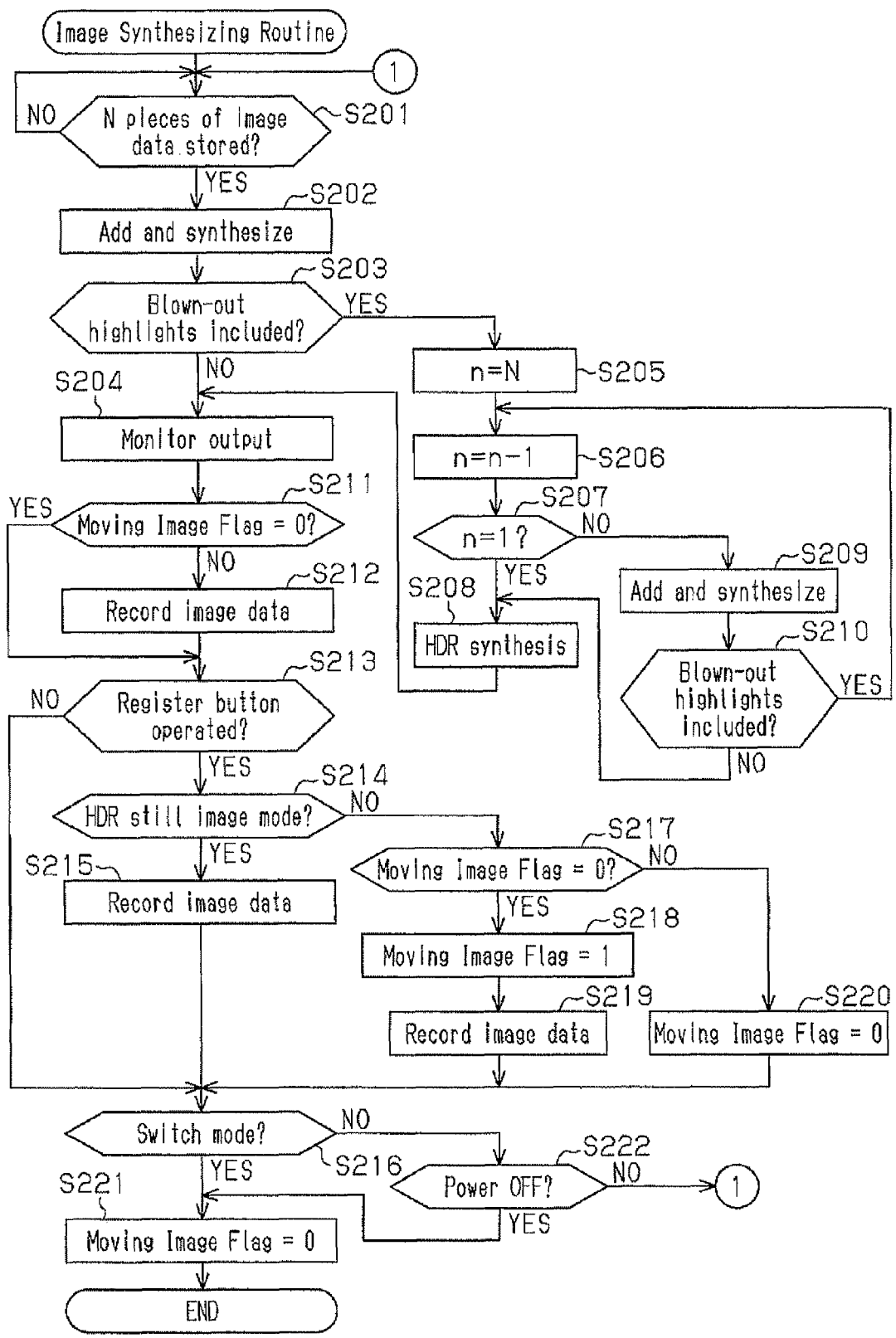
FIG. 5 is a flowchart illustrating an image synthesizing routine.

A procedure for displaying a through-lens image in the HDR still image mode and the HDR moving image mode and a procedure for the HDR imaging will now be described with reference to FIGS. 5 to 7. FIG. 5 shows an image synthesizing routine that is performed when the camera 11 is powered on and the operating mode of the camera 11 is switched to the HDR still image mode or to the HDR moving image mode.

The image synthesizing routine is performed in parallel with the imaging routine described above. The imaging routine shown in FIG. 3 and the image synthesizing routine shown in FIG. 5 are parts of the image synthesis program described above.

In step S201, as shown in FIG. 5, the MPU 17 first determines whether the RAM 20 stores N pieces of image data to be added and synthesized (N is the number greater than 1, and N=4 in the illustrated example). When determining that the RAM 20 stores less than N pieces of image data (NO in step S201), the MPU 17 waits in step S201 until the RAM stores N pieces of image data. When determining that the RAM stores N pieces of image data (YES in step S201), the MPU 17 proceeds to step S202.

In step S202, the MPU 17 obtains the N pieces of image data stored in the RAM 20, and synthesizes the pieces of image data by adding these data pieces to generate synthesized image data (first synthesizing procedure).

The N number of pieces of image data to be added in step S202 is determined by the shutter speed and the number of image frames per second displayed on the monitor 21. More specifically, N is the quotient of the display time per frame (for example 1/30 seconds) divided by the shutter speed (1/120 seconds) (1/30/1/120=4).

In step S203, the MPU 17 determines whether the synthesized image data generated in step S202 includes blown-out highlights. More specifically, the MPU 17 performs histogram analysis of brightness elements represented by the synthesized image data. When determining that there is no pixel including a blown-out highlight (NO in step S203), the MPU 17 proceeds to step S204.

In step S204, the MPU 17 outputs the synthesized image data generated in step S202 onto the monitor 21. As a result, the image data is displayed on the monitor 21 as a through-lens image.

When determining that the synthesized image data includes blown-out highlights in step S203 (YES in step S203), the MPU 17 proceeds to step S205.

In step S205, the MPU 17 sets the value of n, or the number of pieces of image data used to generate high-brightness side image data, as n=N. The high-brightness side image data is used in HDR synthesizing.

In step S206, the MPU 17 decrements the value of n (the number of pieces of image data used to generate high-brightness side image data) by one.

In step S207, the MPU 17 determines whether n=1. When determining that n=1 (YES in step S207), the MPU 17 proceeds to step S206.

In step S208, the MPU 17 uses the synthesized image data generated in step S202 as low-brightness side image data, and uses one piece of the image data obtained from the RAM 20 in step S202 as high-brightness side image data, and then synthesizes the low-brightness side image data and the high-brightness side image data to generate HDR image data (a second synthesizing procedure).

In step S204, the MPU 17 outputs the HDR image data generated in step S208 onto the monitor 21. As a result, the image data is displayed on the monitor 21 as a through-lens image (an output procedure).

When determining that n is greater than 1 (n>1) in step S207 (NO in step S207), the MPU 17 proceeds to step S209.

In step S209, the MPU 17 uses n pieces of image data selected from the N pieces of image data obtained in step S202, and synthesizes the n pieces of image data by adding the data pieces to generate synthesized image data.

In step S210, the MPU 17 determines whether the synthesized image data generated in step S209 includes blown-out highlights. More specifically, the MPU 17 performs histogram analysis of brightness elements represented by the synthesized image data. When determining that a pixel includes a blown-out highlight (YES in step S210), the MPU 17 returns the processing to step S206, and decrements the value of n, or the number of pieces of image data used to generate high-brightness side image data to be used in HDR synthesizing. More specifically, when the brightness level of the synthesized image data is relatively high, the MPU 17 reduces the number of pieces of image data to be used in HDR synthesizing as compared with the number of pieces of image data used when the brightness level of the synthesized image data is relatively low.

When determining that there is no pixel including a blown-out highlight in step S210 (NO in step S210), the MPU 17 proceeds to step S208.

In step S208, the MPU 17 uses the synthesized image data generated in step S202 as low-brightness side image data, uses the synthesized image data generated in step S209 as high-brightness side image data, and synthesizes the low-brightness image data and the high-brightness side image data to generate HDR image data. The MPU 17 then proceeds to step S204.

In step S204, the MPU 17 outputs the HDR image data generated in step S208 onto the monitor 21. As a result, the image data is displayed on the monitor 21 as a through-lens image. The MPU 17 then proceeds to step S211.

In step S211, the MPU 17 determines whether a moving image flag is set at 0. The moving image flag indicates whether the camera is forming (or recording) a moving image. While the camera is forming a moving image, the flag is set at 1. When determining that the moving image flag is set at 1 (NO in step S211), the MPU 17 determines that the camera is forming a moving image and proceeds to step S212.

In step S212, the MPU 17 records, as one piece of image data for forming a moving image, the synthesized image data or the HDR image data output on the monitor 21 onto the memory card 22 via the card I/F 23. The MPU 17 then proceeds to step S213.

When determining that the moving image flag is set at 0 in step S211 (YES in step S211), the MPU 17 proceeds directly to step S213.

In step S213, the MPU 17 determines whether a register button has been operated. The operation of the register button may also be referred to as a recording instruction or storing instruction. When determining that the register button has been operated (YES in step S213), the MPU 17 proceeds to step S214.

In step S214, the MPU 17 determines whether the imaging mode is the HDR still image mode or the HDR moving image mode. When determining that the imaging mode is the HDR still image mode (YES in step S214), the MPU 17 proceeds to step S215.

In step S215, the MPU 17 records, as image data forming a still image, the synthesized image data or the HDR image data output on the monitor 21 onto the memory card 22 via the card I/F 23.

When determining that the register button has not been operated in step S213 (NO in step S213), the MPU 17 proceeds directly to step S216.

When the imaging mode is the HDR moving image mode in step S214 (NO in step S214), the MPU 17 proceeds to step S217.

In step S217, the MPU 17 determines whether the moving image flag is set at 0. When no moving image is being formed, the moving image flag is set at 0 (YES in step S217). In this case, the MPU 17 proceeds to step S218.

In step S218, the MPU 17 sets the moving image flag to 1 and proceeds to step S219.

In step S219, the MPU 17 records, as one of plural pieces of image data for forming a moving image, the synthesized image data or the HDR image data output on the monitor 21 onto the memory card 22 via the card I/F 23. The MPU 17 then proceeds to step S216.

When determining that the moving image flag is set at 1 in step S217 (NO in step S217), the MPU 17 proceeds to step S220.

In step S220, the MPU 17 sets the moving image flag to 0 and proceeds to step S216.

In step S216, the MPU 17 determines whether the operating mode has been switched to the normal imaging mode or the playback mode. When determining that the operating mode has been switched from the HDR still image mode or the HDR moving image mode (YES in step S216), the MPU 17 proceeds to step S221.

The MPU 17 sets the moving image flag to 0 in step S221, and ends the image synthesizing routine. In other words, when the imaging mode is changed while the camera is forming a moving image, the MPU 17 stops forming the moving image and then ends the image synthesizing routine.

When determining that the operating mode remains to be the HDR still image mode or the HDR moving image mode in step S216 (NO in step S216), the MPU 17 proceeds to step S222.

In step S222, the MPU 17 determines whether the camera 11 has been powered off. When determining that the camera 11 has been powered off (YES in step S222), the MPU 17 proceeds to step S221, sets the moving image flag to 0, and then ends the imaging routine.

When determining that the camera 11 has not been powered off in step S222 (NO in step S222), the MPU 17 returns the processing to step S201. More specifically, the MPU 17 repeats the image synthesizing routine while the camera 11 is on and the operating mode remains to be the HDR still image mode or the HDR moving image mode.

The low-brightness side image data may also be referred to as image data obtained under an exposure condition (including a relatively low shutter speed) suitable for a low-brightness level subject. The high-brightness side image data may also be referred to as image data obtained under an exposure condition (including a relatively high shutter speed) suitable for a high-brightness level subject. The synthesized image data generated in step S202 corresponds to data obtained at a relatively low virtual shutter speed, and serves as an example of the low-brightness side image data. The image data used for HDR synthesizing in step S208 (the synthesized image data generated in step S209 or the single piece of image data when n=1 in step S207) corresponds to image data obtained at a relatively high virtual shutter speed, and serves as an example of the high-brightness side image data.

The operation of the camera 11 of the present embodiment with the above-described structure will now be described.

Figure 2:
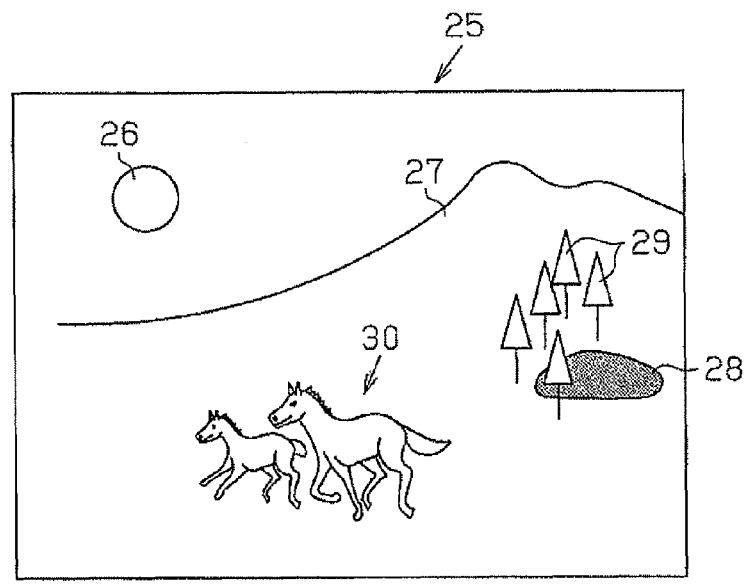
FIG. 2 is a diagram illustrating a screen showing an image to be captured including a bright area and a dark area.

The camera 11 is now assumed to capture the image 25 shown in FIG. 2. As described above, the subject image included in the image 25 has both a dark area and a bright area. Also, the camera 11 is now assumed to be in the HDR moving image mode, to which the imaging mode of the camera 11 has been switched from the normal imaging mode by the user operating the mode switching button included in the operation member 24.

Under the above assumption, the lens unit 12 of the camera 11 is directed toward the mountain 27, which now serves as a subject. As a result, an image formed by a landscape including the mountain 27, the sun 26 on the upper left of the line of the mountain 27, and the lake 28 and the trees 29 at the foot of the mountain as well as of the horses 30 is displayed on the monitor 21 as a through-lens image.

Figure 6:
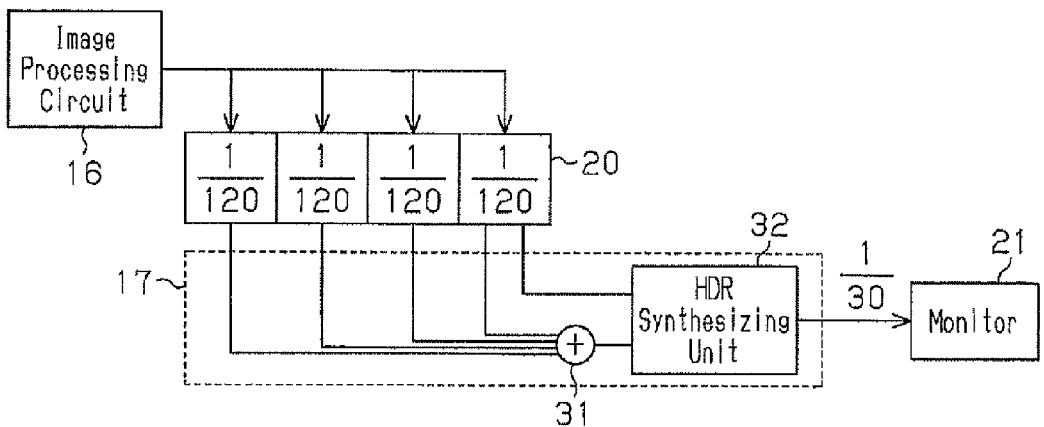
FIG. 6 is a diagram illustrating the procedure for synthesizing images.

More specifically, the imaging element 14 shown in FIG. 6 captures consecutive images of the subject at a shutter speed (for example, 1/120 seconds) higher than the speed corresponding to the time for which a single image is displayed on the monitor 21 as a through-lens image, or corresponding to the inverse of the frame rate (for example 1/30 seconds) and sequentially stores the captured images temporarily into the RAM 20. When four pieces of image data are stored in the RAM 20, an adding synthesizing unit 31, which functions as a first synthesizing means, synthesizes the four pieces of data by adding these data pieces to generate synthesized image data (step S202 in FIG. 5). An HDR synthesizing unit 32, which functions as a second synthesizing means, adds and synthesizes the synthesized image data generated by the adding synthesizing unit 31 and one of the pieces of image data stored in the RAM 20 (for example, the oldest piece of image data stored in the RAM 20, or the piece of image data stored in the rightmost area of the RAM 20) to generate HDR image data (step S208 in FIG. 5). The imaging element 14 then sequentially outputs the HDR image data onto the monitor 21 (step S204 in FIG. 5). Accordingly, the HDR synthesizing unit 32 also functions as an outputting means. This processing is performed repeatedly in a consecutive manner to sequentially switch HDR images displayed on the monitor 21. As a result, through-lens images, which are equivalent to such images displayed when moving images are captured through HDR imaging, are consecutively displayed on the monitor 21.

Figure 7:
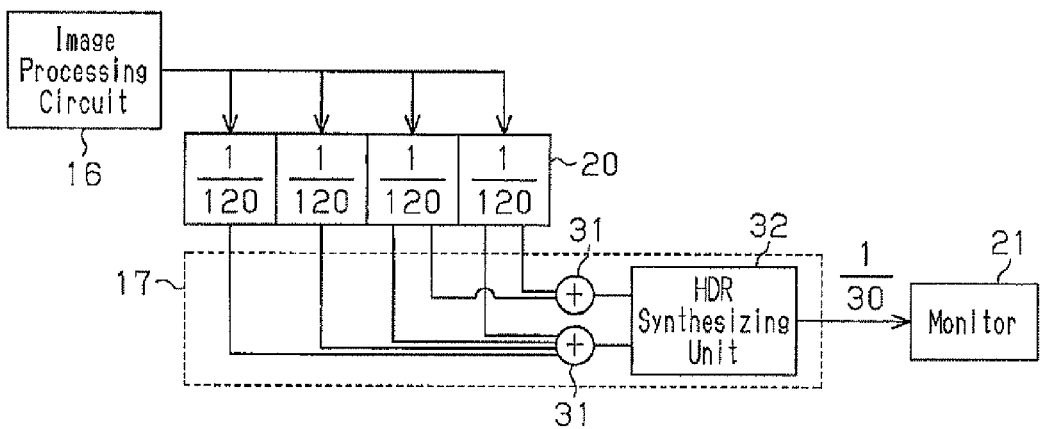
FIG. 7 is a diagram describing a procedure for synthesizing images.

When, for example, the image 25 in FIG. 2 does not include the sun 26 and blown-out highlights would thus not be included in a pixel even when adding and synthesizing plural pieces of image data (NO in step S203 in FIG. 5), the HDR synthesizing unit 32 synthesizes different pieces of synthesized image data obtained by the adding synthesizing unit 31 to generate HDR image data as shown in FIG. 7. FIG. 7 shows the procedures for forming an HDR image of the subject used in a case in which a blown-out highlight would not occur when synthesizing two pieces of image data but would occur when synthesizing three pieces of image data. The procedure shown in FIG. 7 is performed when, for example, n is set to 2 in step S206 in FIG. 5 and the subsequent determination result in step S210 is NO.

More specifically, the imaging element 14 in FIG. 7 captures consecutive images of a subject at a shutter speed (for example 1/120 seconds) higher than the speed corresponding to the time for which a single image is displayed on the monitor 21 as a through-lens image or corresponding to the inverse of the frame rate (for example 1/30 seconds), and sequentially stores pieces of image data representing the captured images temporarily into the RAM 20. When four pieces of image data are stored in the RAM 20, the adding synthesizing unit 31 synthesizes the four pieces of data by adding these data pieces to generate synthesized image data, which serves as low-brightness side image data. The adding synthesizing unit 31 then adds and synthesizes some of the pieces of image data stored in the RAM (for example the first and second oldest pieces of image data stored the RAM, or in the example shown in FIG. 7 the oldest piece of image data stored in the rightmost area of the RAM 20 and the second oldest piece of image data stored in the second rightmost area) to generate synthesized image data, which serves as high-brightness side image data. The HDR synthesizing unit 32 then synthesizes these pieces of synthesized image data to generate HDR image data, and outputs the HDR image data onto the monitor 21. This processing is performed repeatedly in a consecutive manner. This sequentially switches HDR images displayed on the monitor 21. As a result, through-lens images equivalent to such images displayed when moving images are captured through HDR imaging are consecutively displayed on the monitor 21

The user of the camera 11 may fully press the shutter button while the through-lens images are displayed consecutively on the monitor 21. This causes the HDR image data output on the monitor 21 to also be output to the card I/F 23. The HDR image data generated before the user fully presses the shutter button again is recorded onto the memory card 22.

The user may fully press the shutter button after operating the mode switching button to switch the operating mode to the HDR still image mode. This causes the HDR image data output on the monitor 21 to also be output onto the card I/F 23. The HDR image data is recorded onto the memory card 22 as a still image.

The first embodiment has the advantages described below.

(1) The HDR synthesizing unit 32 HDR synthesizes some of the plural pieces of image data used in the adding synthesizing and the synthesized image data generated through the adding synthesizing. The HDR synthesizing unit 32 HDR synthesizes the images captured under a desirable exposure condition (for example, a shutter speed of 1/30 seconds). This reduces positional differences between images as compared with when, for example, the camera first captures an image of a subject at the shutter speed of 1/30 seconds and then captures an image of the subject at the shutter speed of 1/120 seconds and synthesizes the obtained images into an HDR image. As a result, the camera 11 of the first embodiment reduces positional differences between the captured images and enables high dynamic range imaging to be performed without requiring position corrections of the captured images.

(2) The number of pieces of image data for forming the high-brightness side image, which is used in HDR synthesizing, can be changed in accordance with the brightness level of the image data. Thus, the brightness of the image can be adjusted in an optimum manner. This prevents blown-out highlights and enables images with high contrast to be formed.

(3) The HDR image data is displayed consecutively on the monitor 21. Thus, the user can view, as the through-lens images, the HDR image data stored in the memory card 22. This enables the user to roughly view still images and moving images before the user operates the shutter button to store such images into the memory card 22.

(4) The HDR synthesizing unit 32 synthesizes the image data used in the adding synthesizing and the synthesized image data generated through the adding synthesizing to generate HDR image data. This eliminates the need for position corrections between the different pieces of image data, and thus enables the HDR synthesizing to be performed at a high speed. In this case, more pieces of HDR image data can be output per second. This enables HDR imaging to be applicable to moving images.

Second Embodiment

A second embodiment of the present invention will now be described with reference to FIG. 8. The camera according to the second embodiment differs from the camera of the first embodiment in the shutter speed at which an image of a subject is captured and also in the number of pieces of image data that is added and synthesized. The other structure and processing of the second embodiment are the same as the structure and processing described in the first embodiment.

The components of the camera of the second embodiment that are the same as the components in the first embodiment are given the same reference numerals as those components and will not be described in detail.

Figure 8:
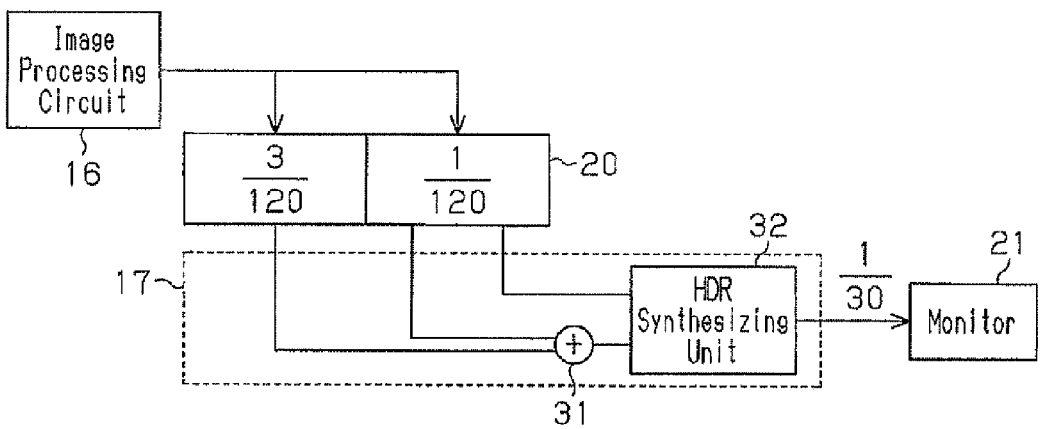
FIG. 8 is a diagram describing the procedures for synthesizing images according to a second embodiment of the present invention.

As shown in FIG. 8, the imaging element 14 captures consecutive images of a subject at a shutter speed higher than the speed set in an exposure condition for a still image (for example the shutter speed of 1/30 seconds), and sequentially stores pieces of image data representing the captured images temporarily into the RAM 20 (storing means). The shutter speed is changed for each imaging operation. The camera 11 of the present embodiment first stores image data obtained at a shutter speed of 1/120 seconds temporarily into the RAM 20, and then stores image data obtained at a shutter speed of 3/120 seconds temporarily into the RAM 20.

When two pieces of image data obtained at different shutter speeds are stored in the RAM 20, the adding synthesizing unit 31 synthesizes these pieces of image data by adding the data pieces to generate synthesized image data (a first synthesizing procedure). The HDR synthesizing unit 32 then synthesizes the synthesized image data generated by the adding synthesizing unit 31 and one of the two pieces of image data having the lower brightness level stored in the RAM 20 to generate HDR image data (a second synthesizing procedure). The HDR synthesizing unit 32 then outputs the generated HDR image data onto the monitor 21 (an output procedure). The piece of image data having the lower brightness level can be the image data captured at a relatively high shutter speed.

When the exposure conditions except the shutter speed are the same, the captured image will be darker and is less likely to include a blown-out highlight as the shutter speed becomes higher. Based on this fact, the HDR synthesizing unit 32 uses the synthesized image data as the low-brightness side image data and uses the image data captured at the relatively high shutter speed (1/120 seconds) as the high-brightness side image data. The HDR synthesizing unit 32 then synthesizes the low-brightness side image data and the high-brightness side image data to generate HDR image data. The HDR synthesizing unit 32 outputs the generated HDR image data onto the monitor 21.

The MPU 17 (31, 32) consecutively performs the subject image capturing, the adding synthesizing, and the HDR synthesizing, and repeats these processes. This sequentially switches the HDR images displayed on the monitor 21. As a result, through-lens images equivalent to such images displayed when moving images are captured through HDR imaging are displayed on the monitor 21.

In this state, the user may press the shutter button fully after operating the mode switching button to change the operating mode to the HDR still image mode. This causes the HDR image data output on the monitor 21 to also be output onto the card I/F 23. As a result, the HDR image data is also recorded onto the memory card 22 as a still image.

The second embodiment has the advantages described below in addition to advantages (1) to (4) of the first embodiment.

(5) The image data captured at a low shutter speed includes fewer dark areas that are crushed black but is more likely to include bright areas with blown-out highlights than image data captured at a high shutter speed. Based on this fact, the camera uses image data having a low brightness level captured at a higher shutter speed when using pieces of image data obtained at different shutter speeds in HDR synthesizing. This further reduces blown-out highlights in bright areas of the image data than when the camera uses only the image data having a high brightness level captured at a low shutter speed.

(6) The use of different shutter speeds enables the number of pieces of image data used in the adding synthesizing to be reduced as compared with when the pieces of image data captured at the same shutter speed are used. This reduces the load on the adding synthesizing unit 31, increases the number of pieces of synthesized image data that can be output per predetermined time, and consequently increases the number of image frames for forming moving images.

The above embodiments may be modified in the following forms.

In the above embodiments, the aperture stop may be controlled in the HDR imaging. More specifically, plural pieces of image data captured consecutively with a large aperture stop may be added and synthesized to generate synthesized image data as bright as image data that would be captured with a small aperture stop. The synthesized image data and the image data used in the adding synthesizing may then be used in the HDR synthesizing. This also reduces positional differences between images used in HDR synthesizing.

In the above embodiments, the brightness level of an image may be estimated based on pixel signals output from the imaging element 14, the shutter speed, and the aperture stop. Alternatively, the camera 11 may additionally include a light measuring sensor to directly measure the brightness level of the subject. The number of pieces of image data used to generate high-brightness side image data may then be set based on these estimates and measurements. Alternatively, a single piece of high-brightness side image data may be constantly used in the HDR synthesizing.

In the second embodiment, three or more pieces of image data captured at different shutter speeds may be stored. Some pieces of image data may then be selected from the three or more pieces of image data in a manner to include at least the piece of image data captured at the highest shutter speed, and the selected pieces of image data may be added and synthesized to generate synthesized image data, which is used in the HDR synthesizing. Alternatively, image data used as the high-brightness side image data may be selected in accordance with the brightness level of the image data representing the subject image or the brightness level of the subject. More specifically, for example, image data representing an image captured at a higher shutter speed may be selected to form the high-brightness side image data when the image data representing the subject image or the subject has a high brightness level due to strong backlight.

In the above embodiments, the operation member 24 may include separate recording buttons to start and stop recording moving images. When the shutter button is operated while HDR image data is being recorded as a moving image, the HDR image data may be recorded as a still image.

In the above embodiments, the exposure conditions including the shutter speed and the aperture stop used in consecutive imaging may be changed in accordance with the brightness level of the subject when the shutter button is pressed halfway in the HDR still image mode or in the HDR moving image mode.

In the above embodiments, the camera 11 may be capable of capturing only a still image or only a moving image. In other words, the camera 11 may be a digital still camera that can capture only a still image, or may be a digital video camera that can capture only a moving image.

The shutter speeds of the electronic shutter and the interval between images to be displayed on the monitor as through-lens images used in the above embodiments are mere examples and thus may take other values. In the HDR still image mode or the HDR moving image mode, the shutter speed at which consecutive images are captured is only required to be higher than the speed corresponding to the interval between images that are displayed on the monitor as through-lens images. The shutter speed at which consecutive images are captured may not be constant. In the HDR still image mode and the HDR moving image mode, the through-lens images or the images that are being recorded may not be displayed but may be recorded directly onto a storage medium such as a memory card.

In the above embodiments, a plurality of (for example, four) images captured by consecutive imaging may be added and synthesized after the second to fourth images are aligned with the first image, which is used as a reference image. The resulting synthesized image and the first image used as the reference image may then be HDR synthesized.

The invention claimed is:

1. An imaging device comprising:
an imaging means for capturing an image of a subject and generating image data;
a storing means for temporarily storing plural pieces of image data consecutively captured by the imaging means;
a first synthesizing means for adding pixel values of the plural pieces of image data stored in the storing means to generate first image data, the first image data having pixel values such that each pixel value of the first image data is a sum of corresponding pixel values of the plural pieces of image data;
a second synthesizing means for synthesizing one of the plural pieces of image data that is used to generate the first image data with the first image data to generate second image data, wherein the second synthesizing means synthesizes with the first image data at least one piece of image data including an image data having the lowest brightness level among the plural pieces of image data, and wherein the second synthesizing means reduces a number of pieces of image data used as the at least one of the plural pieces of image data that is synthesized with the first image data when the brightness of the image data is relatively high as compared with when the brightness of the image data is relatively low; and
an outputting means for outputting the second image data generated by the second synthesizing means.

2. The imaging device according to claim 1, wherein the outputting means sequentially outputs the second image data generated by the second synthesizing means.

3. The imaging device according to claim 1, wherein
the first synthesizing means adds and synthesizes the plural pieces of image data captured per predetermined time by the imaging means and generates the first image data, and
the outputting means sequentially outputs the second image data generated by the second synthesizing means in predetermined time intervals.

4. An imaging device comprising:
an imaging means for capturing an image of a subject and generating image data;
a storing means for temporarily storing plural pieces of image data consecutively captured by the imaging means;
a first synthesizing means for adding pixel values of the plural pieces of image data stored in the storing means to generate first image data, the first image data having pixel values such that each pixel value of the first image data is a sum of corresponding pixel values of the plural pieces of image data;

a second synthesizing means for synthesizing one of the plural pieces of image data that is used to generate the first image data with the first image data to generate second image data, and an outputting means for outputting the second image data generated by the second synthesizing means, wherein:

the plural pieces of image data are a predetermined number of pieces of image data that are captured under a plurality of exposure conditions, the first image data is low-brightness side image data corresponding to a virtual exposure condition more suitable for a low brightness level subject than any of the plurality of exposure conditions, and the low-brightness side image data is generated by adding the predetermined number of pieces of image data, before generating the second image data, the second synthesizing means generates high-brightness side image data by adding a smaller number of pieces of image data than the predetermined number that include a piece of image data captured under an exposure condition most suitable for a high brightness level subject among the predetermined number of pieces of image data or uses image data most suitable for a high brightness level subject as the high-brightness side image data, and the second synthesizing means synthesizes the low-brightness side image data and the high-brightness side image data to generate the second image data.

5. An imaging device comprising:

an imaging means for capturing an image of a subject and generating image data;

a storing means for temporarily storing plural pieces of image data consecutively captured by the imaging means;

a first synthesizing means for adding pixel values of the plural pieces of image data stored in the storing means to generate first image data, the first image data having pixel values such that each pixel value of the first image data is a sum of corresponding pixel values of the plural pieces of image data;

a second synthesizing means for synthesizing one of the plural pieces of image data that is used to generate the first image data with the first image data to generate second image data, wherein the second synthesizing means with the first image data at least one piece of image data including an image data having the lowest brightness level among the plural pieces of image data, wherein the second synthesizing means reduces a number of pieces of image data used as the at least one of the plural pieces of image data that is synthesized with the first image data when the brightness of the image data is relatively high as compared with when the brightness of the image data is relatively low; and an outputting means for outputting the second image data generated by the second synthesizing means, wherein the outputting means sequentially outputs the second image data generated by the second synthesizing means.

6. An imaging device comprising:

an imaging means for capturing an image of a subject and generating image data;

a storing means for temporarily storing plural pieces of image data consecutively captured by the imaging means;

a first synthesizing means for adding pixel values of the plural pieces of image data stored in the storing means to generate first image data, the first image data having pixel values such that each pixel value of the first image data is a sum of corresponding pixel values of the plural pieces of image data;

a second synthesizing means for synthesizing one of the plural pieces of image data that is used to generate the first image data with the first image data to generate second image data, wherein:

the plural pieces of image data are a predetermined number of pieces of image data, each captured at a first shutter speed, the first image data is low-brightness side image data corresponding to a virtual shutter speed that is lower than the first shutter speed, and the low-brightness side image data is generated by adding the predetermined number of pieces of image data, before generating the second image data, the second synthesizing means generates high-brightness side image data by adding a smaller number of pieces of image data than the predetermined number that include the oldest piece of image data captured at the first speed at the oldest timing among the predetermined number of pieces of image data or uses the oldest piece of image data among the predetermined number of pieces of image data as the high-brightness side image data, and the second synthesizing means synthesizes the low-brightness side image data and the high-brightness side image data to generate the second image data; and an outputting means for outputting the second image data generated by the second synthesizing means.

7. An imaging device comprising:

an imaging means for capturing an image of a subject and generating image data;

a storing means for temporarily storing plural pieces of image data consecutively captured by the imaging means;

a first synthesizing means for adding pixel values of the plural pieces of image data stored in the storing means to generate first image data, the first image data having pixel values such that each pixel value of the first image data is a sum of corresponding pixel values of the plural pieces of image data;

a second synthesizing means for synthesizing one of the plural pieces of image data that is used to generate the first image data with the first image data to generate second image data; and an outputting means for outputting the second image data generated by the second synthesizing means, wherein:

the plural pieces of image data are a predetermined number of pieces of image data that are captured at a plurality of shutter speeds, the first image data is low-brightness side image data corresponding to a virtual shutter speed that is lower than the plurality of shutter speeds, and the low-brightness side image data is generated by adding the predetermined number of pieces of image data, before generating the second image data, the second synthesizing means generates high-brightness side image data by adding a smaller number of pieces of image data than the predetermined number that include a piece of image data captured at a highest shutter speed among the predetermined number of pieces of image data or uses a piece of image data captured at the highest shutter speed among the predetermined number of pieces of image data as the high-brightness side image data, and the second synthesizing means synthesizes the low-brightness side image data and the high-brightness side image data to generate the second image data.

8. An imaging device comprising:
an imaging means for capturing an image of a subject and generating image data;
a storing means for temporarily storing plural pieces of image data consecutively captured by the imaging means;
a first synthesizing means for adding pixel values of the plural pieces of image data stored in the storing means to generate first image data, the first image data having pixel values such that each pixel value of the first image data is a sum of corresponding pixel values of the plural pieces of image data;
a second synthesizing means for synthesizing one of the plural pieces of image data that is used to generate the first image data with the first image data to generate second image data; and
an outputting means for outputting the second image data generated by the second synthesizing means, wherein:
the plural pieces of image data are a predetermined number of pieces of image data, each of which is captured under a first exposure condition,
the first image data is low-brightness side image data corresponding to a virtual exposure condition more suitable for capturing a low brightness level subject than the first exposure condition, and the low-brightness side image data is generated by adding the predetermined number of pieces of image data,
before generating the second image data, the second synthesizing means generates high-brightness side image data by adding a smaller number of pieces of image data than the predetermined number that include the oldest piece of image data captured under the first exposure condition at the oldest timing among the predetermined number of pieces of image data or uses the oldest piece of image data among the predetermined number of pieces of image data as the high-brightness side image data, and
the second synthesizing means synthesizes the low-brightness side image data and the high-brightness side image data to generate the second image data.

9. A non-transitory computer readable medium comprising an image synthesis program that, when executed, causes a computer to perform:
temporarily storing plural pieces of image data consecutively captured by an imaging means that captures an image of a subject and generates image data;
adding pixel values of the stored plural pieces of image data to generate first image data, the first image data having pixel values such that each pixel value of the first image data is a sum of corresponding pixel values of the plural pieces of image data;
synthesizing i) one of the plural pieces of image data that is used to generate the first image data with the first image data to generate second image data and ii) with the first image data at least one piece of the plurality pieces of image data including an image data having a lowest brightness level among the plural pieces of image data so as to reduce a number of pieces of image data used as the at least one piece of the plural pieces of image data that is synthesized with the first image data when a brightness of the image data is relatively high as compared with when the brightness of the image data is relatively low; and
outputting the generated second image data.

10. An imaging device comprising:
an imaging means for capturing an image of a subject and generating image data;
a first synthesizing means for aligning a piece of image data with reference image data and adding pixel values of the piece of image data and corresponding pixel values of the reference image data to generate first image data; and
a second synthesizing means for synthesizing the reference image data that is used to generate the first image data and the first image data to generate second image data, wherein the second synthesizing means synthesizes with the first image data at least one piece of image data including the image data having the lowest brightness level among the plural pieces of image data, and wherein the second synthesizing means reduces a number of pieces of image data used as the at least one piece of the plural pieces of image data that is synthesized with the first image data when the brightness of the image data is relatively high as compared with when the brightness of the image data is relatively low.

11. A non-transitory computer readable medium comprising an image synthesis program that, when executed, causes a computer to perform:
capturing an image of a subject and generating image data;
aligning a piece of image data with reference image data and adding pixel values of the piece of image data and corresponding pixel values of the reference image data to generate first image data; and
synthesizing the reference image data that is used to generate the first image data and the first image data to generate second image data, and synthesizes with the first image data at least one piece of image data including the image data having the lowest brightness level among the plural pieces of image data to reduce a number of pieces of image data used as the at least one of the plural pieces of image data that is synthesized with the first image data when the brightness of the image data is relatively high as compared with when the brightness of the image data is relatively low.

* * * * *